US012589796B2

(12) United States Patent　(10) Patent No.:　US 12,589,796 B2
Kim　(45) Date of Patent:　Mar. 31, 2026

(54) STEERING ASSISTANCE SYSTEM, STEERING CONTROL DEVICE, AND STEERING CONTROL METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 430 days.

(21) Appl. No.: 17/438,258

(22) PCT Filed: Mar. 5, 2020

(86) PCT No.: PCT/KR2020/003090
§ 371 (c)(1),
(2) Date: Sep. 10, 2021

(87) PCT Pub. No.: WO2020/184893
PCT Pub. Date: Sep. 17, 2020

(65) Prior Publication Data
US 2022/0185366 A1　Jun. 16, 2022

(30) Foreign Application Priority Data
Mar. 14, 2019　(KR) ........................ 10-2019-0029488

(51) Int. Cl.
B62D 5/04　(2006.01)
B62D 3/12　(2006.01)
B62D 15/02　(2006.01)

(52) U.S. Cl.
CPC ............. B62D 5/0484 (2013.01); B62D 3/12 (2013.01); B62D 5/0496 (2013.01); B62D 15/0215 (2013.01)

(58) Field of Classification Search
None
See application file for complete search history.

(56) References Cited

U.S. PATENT DOCUMENTS

2004/0243287 A1　12/2004　Yanaka et al.
2005/0061574 A1　3/2005　Torizawa
(Continued)

FOREIGN PATENT DOCUMENTS

JP　2003-026020　1/2003
JP　2009-166674　7/2009
(Continued)

OTHER PUBLICATIONS

International Search Report for PCT/KR2020/003090 mailed on Jun. 11, 2020 (now published as WO 2020/184893) with English translation provided by the WIPO.
(Continued)

*Primary Examiner* — Adam D Tissot
*Assistant Examiner* — Charles Pall
(74) *Attorney, Agent, or Firm* — WOMBLE BOND DICKINSON (US) LLP

(57) ABSTRACT
The present disclosure relates to a steering assistance system, a steering control device, and a steering control method. Specifically, the steering control device according to the present invention calculates a target rack stroke on the basis of steering information input by a driver and calculates a target instruction current according to the target rack stroke, wherein different instruction currents are calculated depending on whether other steering control devices fail, and are applied to a steering motor according to predetermined application patterns.

17 Claims, 15 Drawing Sheets

(56) References Cited

U.S. PATENT DOCUMENTS

| | | | | |
|---|---|---|---|---|
| 2011/0315469 A1* | 12/2011 | Uryu | .................... | B62D 5/0487 |
| | | | | 180/443 |
| 2011/0315470 A1* | 12/2011 | Uryu | .................... | B62D 5/0484 |
| | | | | 180/446 |
| 2016/0329853 A1* | 11/2016 | Koseki | .................... | H02P 29/68 |
| 2017/0166248 A1* | 6/2017 | Asao | ........................ | H02P 29/00 |
| 2018/0037254 A1* | 2/2018 | Izutani | ................ | B62D 5/0487 |
| 2019/0023315 A1* | 1/2019 | Takizawa | ............. | B62D 5/0484 |
| 2020/0180685 A1* | 6/2020 | Suzuki | ................. | B62D 5/0412 |
| 2020/0189607 A1* | 6/2020 | Wesenberg | ............ | B62D 5/003 |

FOREIGN PATENT DOCUMENTS

| | | | | |
|---|---|---|---|---|
| JP | 2009166674 | A | * | 7/2009 |
| JP | 2012-25372 | | | 2/2012 |
| JP | WO2016/063368 | | | 4/2017 |

OTHER PUBLICATIONS

Written Opinion of the International Searching Authority for PCT/KR2020/003090 mailed on Jun. 11, 2020 (now published as WO 2020/184893) with English translation provided by Google Translate.

Office Action dated Jan. 23, 2024 for Korean Patent Application No. 10-2019-0029488 and its English translation from Global Dossier.

Notice of Allowance dated Jul. 23, 2024 for Korean Patent Application No. 10-2019-0029488 and its English translation from Global Dossier.

* cited by examiner

_100_

_110_

| steering angle sensor | —_111_ |
| rack position sensor | —_112_ |
| temperature sensor | —_113_ |
| motor position sensor | —_114_ |

| first steering control device | steering motor | second steering control device |

_120_          _140_          _130_

——— first application pattern
——— second application pattern

<first initial internal temperature>

STEERING ASSISTANCE SYSTEM, STEERING CONTROL DEVICE, AND STEERING CONTROL METHOD

CROSS-REFERENCE TO RELATED APPLICATIONS

This application is the national stage of International Application No. PCT/KR2020/003090, filed on Mar. 5, 2020, which claims priority, under 35 U.S.C. 119(a), to Korean Patent Application No. 10-2019-0029488 filed in the Korean Intellectual Property Office on Mar. 14, 2019, the disclosure of which is incorporated by reference herein in their entireties.

TECHNICAL FIELD

The disclosure relates to a steering assist system, a steering control device, and a steering control method.

BACKGROUND ART

Nowadays, the development of vehicle safety control systems is rapidly growing according to the demand of consumers. Such a safety system is applied to various fields, such as steering, braking, and suspension, and has recently been implemented in various ways using electronic components.

In particular, in steering assist systems that assist steering of vehicles, increasing interest switches from systems conventionally using a single controller for controlling the vehicle to redundant system-applied steering assist systems adopting two or more controllers to control vehicle steering. Such a redundant system may provide higher driving stability as two or more controllers each perform a control operation.

However, if a specific controller fails in the steering control system implementing the redundant system, it is very limited to provide steering assistance power required by the driver only with the remaining normal controllers. If the steering motor is forcibly controlled with only some controllers, even normal controllers may be damaged due to overheating.

DETAILED DESCRIPTION OF THE INVENTION

Technical Problem

In view of the background, the disclosure is to provide a steering assist system, a steering control device, and a steering control method capable of performing steering of a vehicle even when a specific steering control device among a plurality of steering control devices fails.

The disclosure is also to provide a steering assist system, a steering control device, and a steering control method capable of preventing a normal steering control device from being damaged due to overheating when a specific steering control device fails.

The disclosure is also to provide a steering assist system, a steering control device, and a steering control method capable of preventing a delay in steering response time by applying a command current to a steering motor according to various application patterns.

Technical Solution

To achieve the foregoing objectives, according to an aspect of the disclosure, there is provided a steering assist system, comprising a steering angle sensor detecting a steering angle by rotation of a steering wheel and generating and outputting steering information about the steering angle, a steering motor including a first winding motor and a second winding motor, a first steering control device electrically connected with the first winding motor, and a second steering control device electrically connected with the second winding motor and electrically connected with the first steering control device to be able to communicate with the first steering control device, wherein the first steering control device calculates a target rack stroke and a target command current corresponding to the target rack stroke based on the steering information, recognizes whether the second steering control device fails, applies a first command current identical to the target command current to the steering motor according to a preset application pattern if the second steering control device fails, and if the second steering control device does not fail, calculates a second command current corresponding to half of the target command current and applies the second command current to the steering motor.

According to another aspect of the disclosure, there is provided a steering control device, comprising a rack stroke calculation unit calculating a target rack stroke based on steering information input by a driver, a fail recognition unit recognizing whether another steering control device fails, a command current calculation unit calculating a target command current according to the target rack stroke, the command current calculation unit calculating a first command current if the other steering control device fails and calculating a second command current smaller than the first command current if the other steering control device does not fail, and a command current application unit applying the first command current to a steering motor according to a preset application pattern if the other steering control device fails and applying the second command current to the steering motor if the other steering control device does not fail.

According to still another aspect of the disclosure, there is provided a steering control method, comprising a rack stroke calculation step calculating a target rack stroke based on steering information input by a driver, a target command current calculation step calculating a target command current according to the target rack stroke, a fail recognition step recognizing whether another steering control device fails, a command current calculation step calculating a first command current if the other steering control device fails and calculating a second command current smaller than the first command current if the other steering control device does not fail, and a command current application step applying the first command current to a steering motor according to a preset application pattern if the other steering control device fails and applying the second command current to the steering motor if the other steering control device does not fail.

Advantageous Effects

As described above, according to the disclosure, the disclosure may provide a steering assist system, a steering control device, and a steering control method capable of performing steering of a vehicle even when a specific steering control device among a plurality of steering control devices fails.

The disclosure may also provide a steering assist system, a steering control device, and a steering control method capable of preventing a normal steering control device from being damaged due to overheating when a specific steering control device fails.

The disclosure may also provide a steering assist system, a steering control device, and a steering control method capable of preventing a delay in steering response time by applying a command current to a steering motor according to various application patterns.

MODE FOR CARRYING OUT THE INVENTION

Hereinafter, embodiments of the disclosure are described in detail with reference to the accompanying drawings. Such denotations as "first," "second," "A," "B," "(a)," and "(b)," may be used in describing the components of the present invention. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

Figure 1:
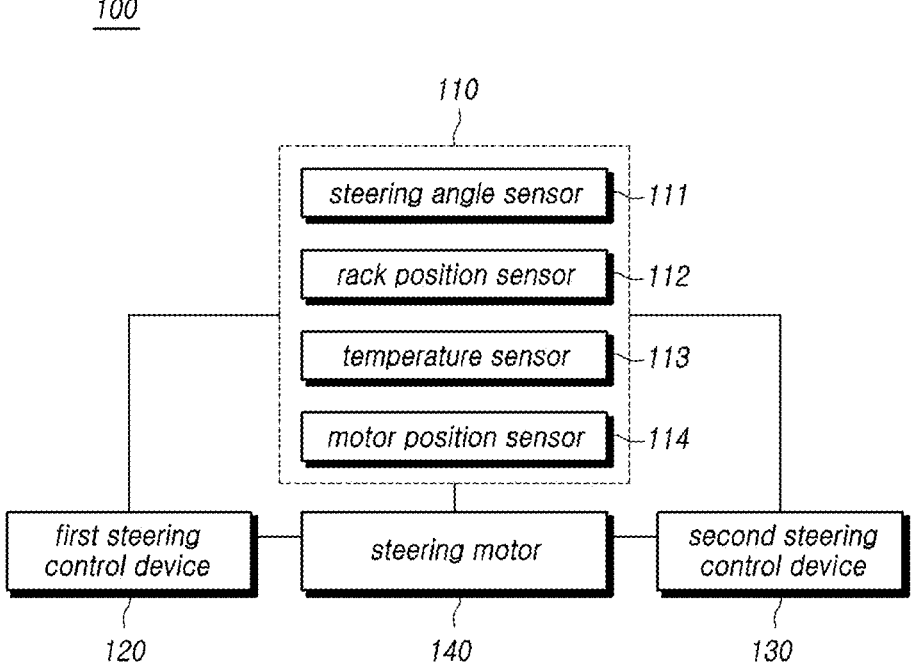
FIG. 1 is a block diagram illustrating a steering assist system according to the disclosure.

FIG. 1 is a block diagram illustrating a steering assist system 100 according to the disclosure.

Referring to FIG. 1, a steering assist system 100 according to the disclosure may include a sensor module 110, a first steering control device 120, a second steering control device 130, and a steering motor 140.

The sensor module 110 may detect internal information about a transportation means, such as a vehicle, generate an electrical signal indicative of internal information, and output it to the first steering control device 120 and the second steering control device 130.

For example, the sensor module 110 detects the speed of the vehicle, generates a signal indicating speed information, and outputs it to the first steering control device 120 and the second steering control device 130. However, embodiments of the disclosure are not limited thereto.

Such a sensor module 110 may include one or more sensors, and for example, the sensor module 110 may include a steering angle sensor 111, a rack position sensor 112, a temperature sensor 113, and a motor position sensor 114.

Here, the steering angle sensor 111 may detect a steering angle by rotation of the steering wheel, generate a signal indicating steering information, and output it to at least one of the first steering control device 120 and the second steering control device 130.

Here, the rack position sensor 112 may detect the position of the rack of the rack bar (not shown), generate a signal indicating rack stroke information about the rack stroke corresponding to the position of the rack, and output it to at least one of the first steering control device 120 and the second steering control device 130.

Here, the temperature sensor 113 may sense the internal temperature of the first steering control device 120 or the second steering control device 130, generate a signal indicating temperature information, and output it to at least one of the first steering control device 120 and the second steering control device 130.

Here, the motor position sensor 114 may detect the rotation angle of the steering motor 140, generate a signal indicative of rotation angle information, and output it to at least one of the first steering control device 120 and the second steering control device 130.

The steering control device may receive internal information from the sensor module 110, calculate a steering control value for providing steering assistance force, and output an electrical control signal corresponding thereto to the steering motor 140.

Specifically, the steering control device receives steering information from the steering angle sensor 111, calculates a required target rack stroke based on the steering information and a target command current according to the target rack stroke, and applies the command current to the steering motor 140.

Here, the target rack stroke may mean a rack stroke of the rack bar required to generate an appropriate steering assistance force according to steering information.

Here, the target command current is an input current of the steering motor 140, and may refer to a current generating the output of the steering motor 140 necessary for the rack bar to linearly move as much as the target rack stroke.

The target command current may be an alternating current (AC) and may be expressed as a root mean square (RMS).

Such a steering control device may be implemented with an electronic control unit (ECU) including a micro controller unit (MCU), an inverter, and a printed circuit board (PCB), and software. However, embodiments of the disclosure are not limited thereto.

In this case, there may be two or more steering control devices, and the steering assist system 100 including a plurality of steering control devices may implement a redundant system. For example, the steering assist system 100 according to the disclosure includes a first steering control device 120 and a second steering control device 130 to implement a redundant system. However, without being limited thereto, the steering assist system 100 may include three or more steering control devices to implement a redundant system. The operation of the redundant system is described in detail below with reference to FIGS. 2 to 7.

The steering motor 140 may receive a control signal from the steering control device and generate an output corresponding to the control signal. Specifically, the steering motor 140 may receive a command current from each of the first steering control device 120 and the second steering control device 130, and drive at the torque and rotational speed corresponding to the entire command current.

The steering motor 140 may be a dual-winding brushless AC (BLAC) motor. In other words, the steering motor 140 may include a first winding motor and a second winding motor.

Although not shown, the rack bar coupled to the steering motor 140 may perform a linear motion by the rotation of the steering motor 140, and a rack stroke occurs due to the linear motion of the rack bar. Specifically, when the steering motor 140 is driven, the rack bar may make a linear motion, and the tie rods, knuckle arms, and wheels coupled to the rack bar move left or right.

Meanwhile, to provide an appropriate steering assistance force, an appropriate rack stroke needs to be generated, and the output of the steering motor 140 is important to generate such a rack stroke. As the output of the steering motor 140 increases, a larger command current is required.

Figure 2:
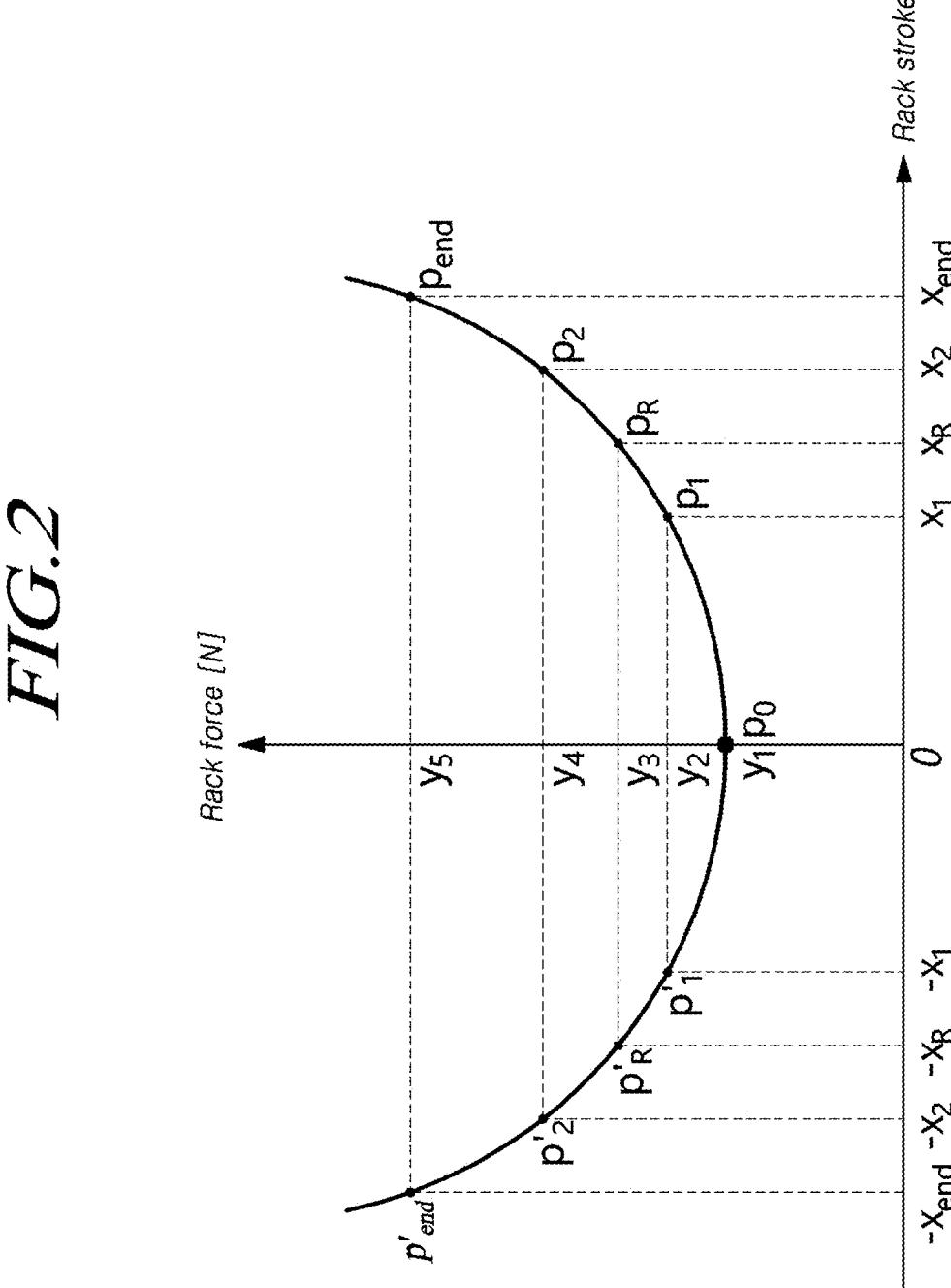
FIG. 2 is a graph illustrating the relationship between rack stroke and rack force.

FIG. 2 is a graph illustrating the relationship between rack stroke and rack force.

Referring to FIG. 2, with respect to the origin, which is the center position of the rack, the rack stroke may increase or decrease in a range of the ends of the rack ($x_{end}$, $-x_{end}$). As the rack stroke moves away from the origin in either direction, the rack bar makes a left or right linear motion.

In this case, the sign of the x-axis may correspond to the position of the rack. For example, +x may mean a state in which the rack bar moves to the right, and –x may mean a state in which the rack bar moves to the left. However, embodiments of the disclosure are not limited thereto.

Further, referring to the graph illustrated in FIG. 2, as the rack stroke increases, the rack force corresponding to the output of the steering motor 140 tends to non-linearly increase. For example, as the rack stroke increases from $x_1$ to $x_{end}$, the resulting rack force also increases from $y_2$ to $y_5$, and the overall graph is shaped as a curve passing through $P_1$ to $P_{end}$. The graph shape is symmetrical about the y axis. Therefore, $P_1$ to $P_{end}$ and $P'_1$ to $P'_{end}$ are also symmetrical.

Here, if the required rack force increases, the command current applied to the steering motor 140 should also increase. In this case, as the command current increases, the internal temperature of the steering control device (e.g., the temperature of the PCB included in the steering control device) is inevitably increased. In particular, if a command current for the rack bar to reach the end ($x_{end}$, $-x_{end}$) of the rack is generated only with one steering control device, the steering control device may internally overheat and burn out.

Therefore, to more stably provide steering assistance power, a plurality of steering control devices are required. However, in case a specific steering control device fails among a plurality of steering control devices, each of the remaining normal steering control devices applies, to the steering motor 140, a command current whose limit corresponds to 1/N of the maximum target command current, so as to prevent burnout and may previously set a reference rack stroke $x_R$ corresponding to such a command current.

Here, the reference rack stroke $x_R$ may mean a limit rack stroke that may be implemented without burnout of the remaining normal steering control devices due to overheating in a case where the specific steering control device among the plurality of steering control devices fails, and the steering motor 140 is controlled only with the normal remaining steering control devices.

Referring to FIGS. 1 and 2, e.g., when the first steering control device 120 fails, and the steering motor 140 is controlled only with the second steering control device 130, the second steering control device 130 presets and stores $y_3$ corresponding to half of $y_5$ which is the rack force value at the end ($x_{end}$, $-x_{end}$) of the rack and the rack stroke corresponding thereto, as the reference rack stroke $X_R$.

As described above, the steering assist system 100 according to the disclosure may prevent the steering control devices from burnout due to overheating by controlling the steering motor 140 by each of the plurality of steering control devices.

The operation of the steering assist system 100 according to the disclosure is described below in detail with a focus on the steering control device and the steering motor 140.

Figure 3:
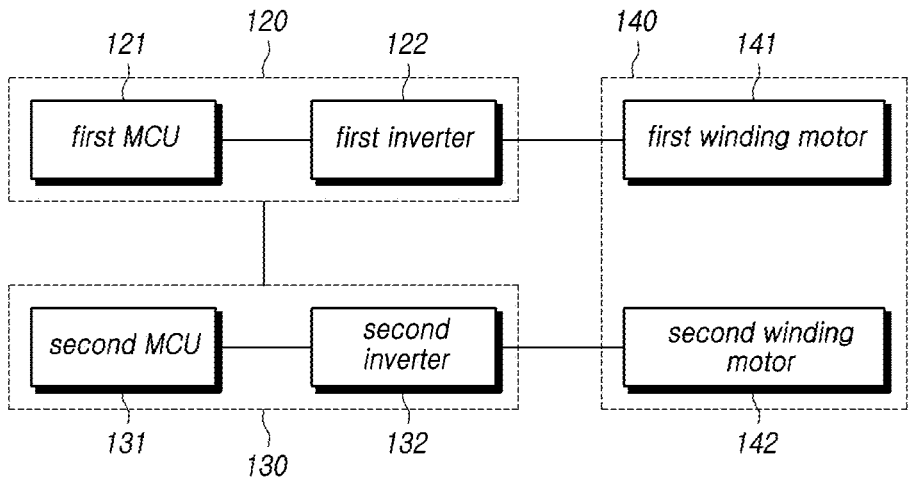
FIG. 3 is a view illustrating an embodiment of a steering assist system according to the disclosure.
Figure 4:
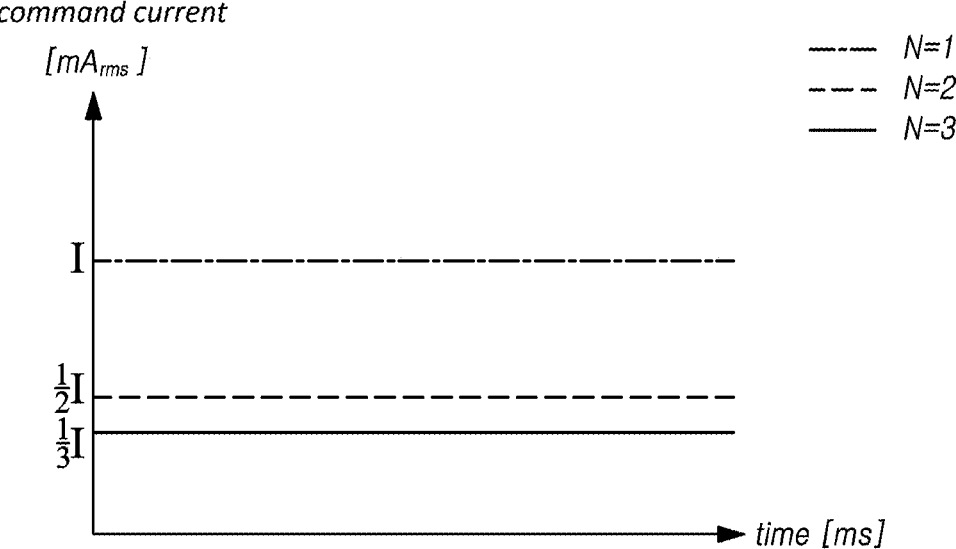
FIG. 4 is a graph illustrating the command current according to the number of steering control devices.
Figure 5:
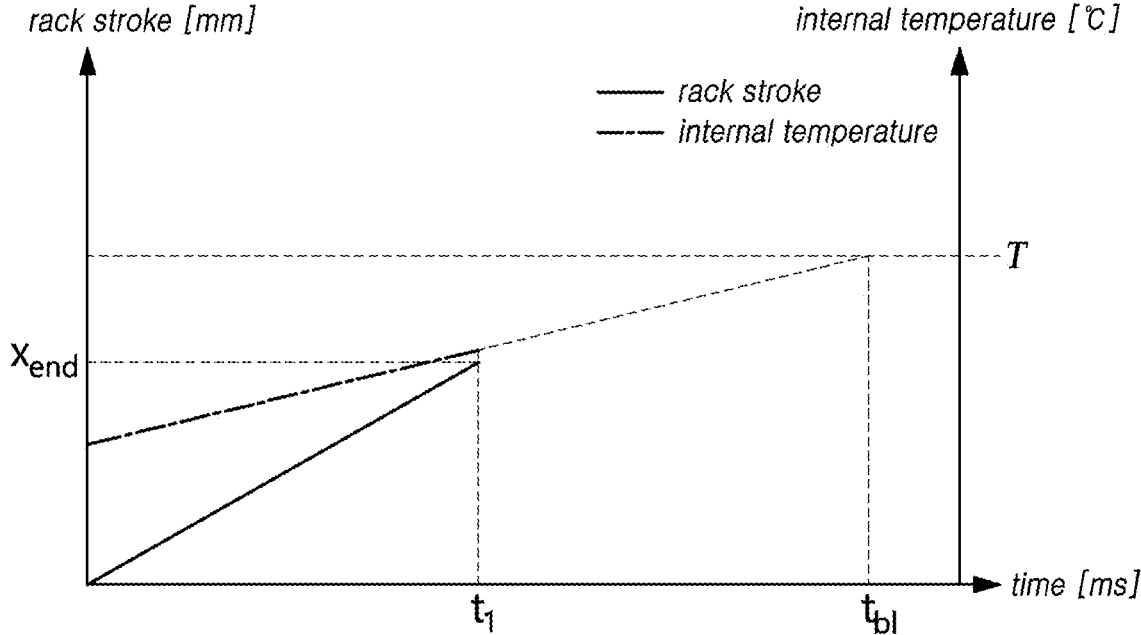
FIG. 5 is a graph illustrating the rack stroke and internal temperature over time when a plurality of steering control devices are normal according to the disclosure.

FIG. 3 is a view illustrating an embodiment of a steering assist system 100 according to the disclosure. FIG. 4 is a graph illustrating the command current according to the number of steering control devices. FIG. 5 is a graph illustrating the rack stroke and internal temperature over time when a plurality of steering control devices are normal according to the disclosure.

Referring to FIG. 3, each of the plurality of steering control devices may be implemented as an ECU including an MCU, an inverter, and a PCB (not shown). For example, a first steering control device 120 may be implemented as a first ECU including, e.g., a first MCU 121 and a first inverter 122, and a second steering control device 130 may be implemented as a second ECU including, e.g., a second MCU 131 and a second inverter 132.

Meanwhile, the plurality of steering control devices are electrically connected to each other to implement a redundant system. For example, the first steering control device 120 and the second steering control device 130 are electrically connected.

By being connected therebetween, the plurality of steering control devices may internally perform mutual communication and transfer or receive their respective state information. For example, when the state of the first steering control device 120 is abnormal (or fails), an electrical signal indicating state information of the first steering control device 120 may be output to the second steering control device 130, and the second steering control device 130 may recognize the state of the first steering control device 120 by receiving the above-described electrical signal. In this case, the electrical signal may be implemented in the form of a flag.

Meanwhile, each of the plurality of steering control devices is electrically connected to a plurality of winding motors included in the dual winding steering motor 140. For example, the first inverter 122 included in the first steering control device 120 may be electrically connected to a first winding motor 141 included in the steering motor 140, and the second inverter 132 included in the second steering control device 130 may be electrically connected to a second winding motor 142 included in the steering motor 140.

Each of the plurality of steering control devices may calculate a target rack stroke based on steering information and may calculate a target command current corresponding to the target rack stroke. For example, the first MCU 121 included in the first steering control device 120 calculates the target rack stroke and the target command current.

In this case, each of the plurality of steering control devices may calculate a command current for finally applying the target command current to the steering motor 140 considering the state information of another steering control devices.

In other words, unless the state of another steering control device is normal or fails, each of the plurality of steering control devices may calculate a portion of the target command current.

For example, unless the first steering control device 120 and the second steering control device 130 is normal or fails, the first MCU 121 and the second MCU 131 each calculates a command current corresponding to half of the target command current. Here, the command current may be a value obtained by dividing the target command current by the number of steering control devices.

Referring to FIG. 4, e.g., when there is one steering control device included in the steering assist system 100 according to the disclosure, the command current calculated by the steering control device is the same as the target command current I. On the other hand, when there are two steering control devices included in the steering assist system 100 according to the disclosure, the command current calculated by each steering control device is half (½I) of the target command current I. When there are three steering control devices included in the steering assist system 100 according to the disclosure, the command current calculated by each steering control device is a third $$\left(\frac{1}{3}I\right)$$

of the target command current I.

In other words, if there are N steering control devices and all of the plurality of steering control devices are normal, the command current calculated by each of the plurality of steering control devices may be the value $$\left(\frac{1}{N}I\right)$$

obtained by dividing the target command current I by N.

Each of the plurality of steering control devices applies a command current to its respective connected winding motor. Referring to FIG. 3, e.g., the command current calculated by the first MCU 121 is applied to the first winding motor 141 through the first inverter 122, and the command current calculated by the second MCU 131 is applied to the second winding motor 142 through the second inverter 132.

If all of the above-mentioned plurality of steering control devices are normal, the rack bar may be moved up to the end (e.g., $x_{end}$) of the rack bar without burnout of each steering control device due to overheating.

Referring to FIGS. 3 and 5, e.g., when the rack stroke increases from the center position of the rack, the internal temperature of each of the plurality of steering control devices also increases. However, since the value of the command current applied by each steering control device is less than the target command current, the rack may arrive at the end (e.g., $x_{end}$) before the steering control device burns out due to overheating. In other words, the time when the rack reaches the end is shorter than the time $t_{b1}$ of burnout according to the limit temperature T.

Therefore, as described above, the steering assist system 100 according to the disclosure may move the rack up to the end while preventing each steering control device from burnout due to overheating.

Meanwhile, even when a specific steering control device among the plurality of steering control devices fails, the steering assist system 100 according to the disclosure may limitedly control the steering motor 140 only with the remaining normal steering control devices.

The operation of the steering assist system 100 according to the disclosure when a specific steering control device fails is described below in detail.

Figure 6:
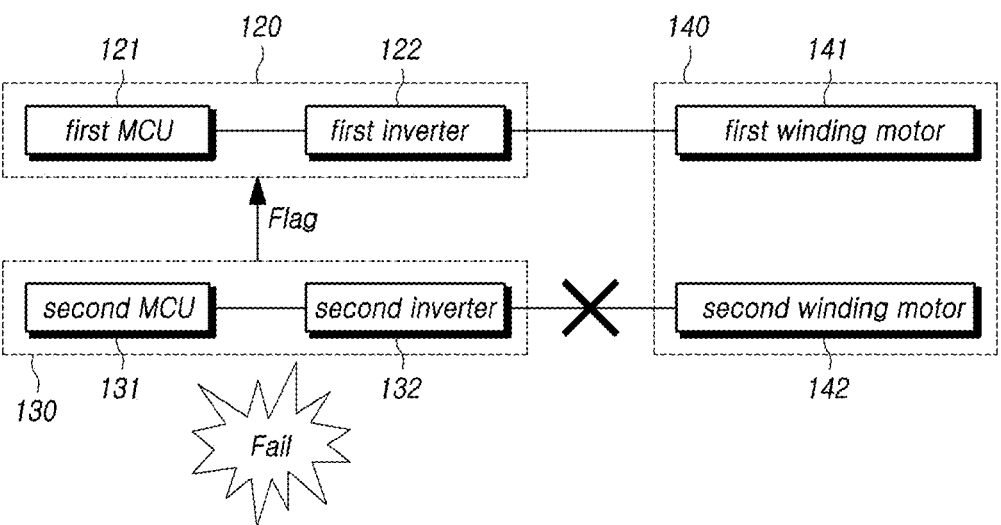
FIG. 6 is a block diagram illustrating another embodiment of a steering assist system according to the disclosure.
Figure 7:
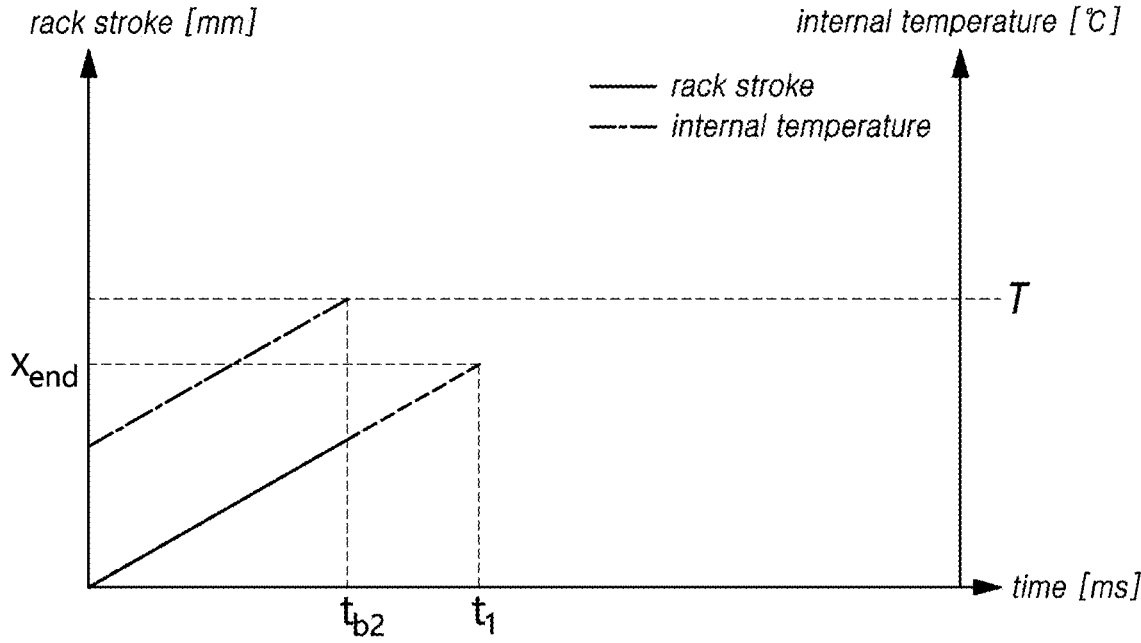
FIG. 7 is a first graph illustrating the rack stroke and internal temperature over time when a specific steering control device fails according to the disclosure.

FIG. 6 is a block diagram illustrating another embodiment of a steering assist system 100 according to the disclosure. FIG. 7 is a first graph illustrating the rack stroke and internal temperature over time when a specific steering control device fails according to the disclosure.

Referring to FIG. 6, when a specific steering control device among a plurality of steering control devices fails, the steering assist system 100 according to the disclosure may limitedly perform steering of the vehicle only with the remaining normal steering control devices so as to prevent an accident.

In other words, the normal steering control device may control the steering motor 140 using the command current corresponding to a preset reference rack stroke as a limit range to prevent burnout due to overheating.

For example, when the second steering control device 130 fails due to an error in, e.g., the second MCU 131 or the second inverter 132, the second steering control device 130 generates a flag and outputs it to the first steering control device 120. If the first steering control device 120 receives the flag from the second steering control device 130, the first steering control device 120 controls the first winding motor 141 using half of the command current corresponding to the end (e.g., $x_{end}$) of the rack as the limit range. Accordingly, the range of the rack stroke is also reduced.

Here, if the rack stroke range is limited so that the remaining normal steering control devices are not burned out due to overheating, the driver may feel uncomfortable due to the limited steering and may not be able to avoid an unexpected accident.

However, in a case where the target rack stroke is greater than the reference rack stroke, if the normal steering control device applies the target command current to the steering motor 140, the internal temperature of the steering control device may surge, and the normal steering control device may be overheated and burned out.

Referring to FIGS. 6 and 7, e.g., when the target rack stroke is the end (e.g., $x_{end}$) of the rack, the value of the command current applied by the first steering control device 120 which is in the normal state exceeds the limit value unlike shown in FIG. 5. Thus, the first steering control device 120 is burned out due to overheating before the rack reaches the end (e.g., $x_{end}$). In other words, the time $t_{b2}$ when the first steering control device 120 is burned out due to overheating is shorter than the time $t_{b1}$ when the rack reaches the end (e.g., $x_{end}$), the time tb1 when burnout occurs due to overheating.

Therefore, even when a specific steering control device fails, it is necessary to steer the vehicle by moving the rack up to the end only with the normal steering control device.

A steering control device according to the disclosure for addressing the foregoing problems is described below in detail.

Figure 8:
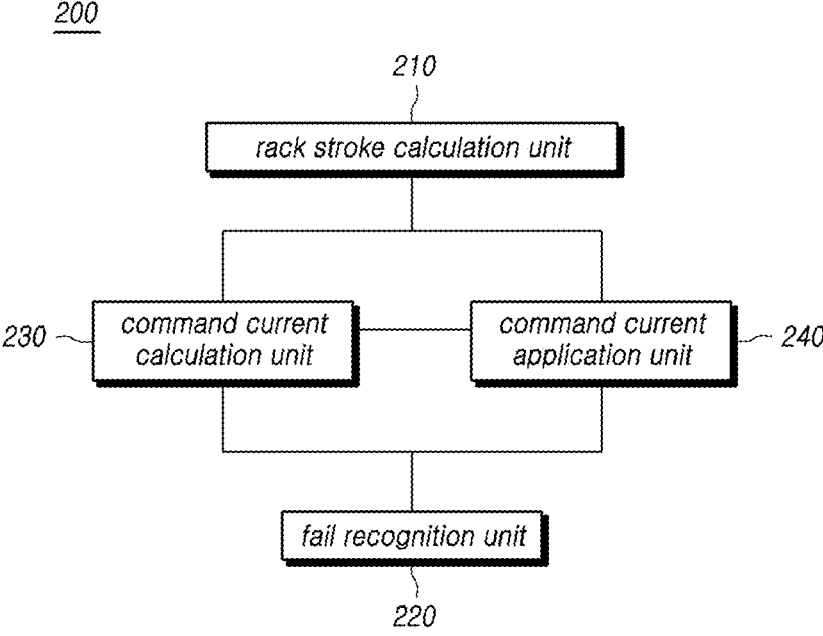
FIG. 8 is a block diagram illustrating a steering control device according to the disclosure.

FIG. 8 is a block diagram illustrating a steering control device 200 according to the disclosure.

Referring to FIG. 8, a steering control device 200 according to the disclosure may include a rack stroke calculation unit, a fail recognition unit, a command current calculation unit, and a command current application unit.

The steering control device 200 may mean each of the first steering control device 120 and the second steering control device 130.

The rack stroke calculation unit may calculate a target rack stroke based on steering information input by the driver. For example, the rack stroke calculation unit receives steering information detected by the steering angle sensor 111 and calculates a rack stroke using the steering angle of the steering wheel indicated by the steering information. The rack stroke according to the steering angle of the steering wheel may be calculated through a design value by a designer or an algorithm.

The rack stroke calculation unit may generate information about the rack stroke and output it to the command current calculation unit and the command current application unit.

The fail recognition unit may recognize whether the other steering control device fails. Specifically, the fail recognition unit may recognize the fail in the other steering control device if receiving a flag indicating the fail from the other steering control device.

Referring to FIG. 6, e.g., when the second steering control device 130 fails, the second steering control device 130 may transmit a flag to the first steering control device 120, and the fail recognition unit included in the first steering control device 120 receives the flag and recognizes the fail in the second steering control device 130. However, without being limited thereto, when the first steering control device 120 fails, the fail recognition unit included in the second steering control device 130 may recognize the fail in the first steering control device 120 in the same manner as described above.

The fail recognition unit may recognize the failure in the other steering control device and output information about the result to the command current calculation unit and the command current application unit.

The command current calculation unit may calculate a target command current according to the target rack stroke. The command current calculation unit may calculate a first command current if the other steering control device fails and, if the other steering control device does not fail, the command current calculation unit may calculate a second command current smaller than the first command current.

Specifically, the command current calculation unit may calculate the first command current equal to the target command current if the other steering control device fails and, if the other steering control device fails, calculate the second command current by dividing the target command current by the number of the steering control devices.

For example, the command current calculation unit included in the first steering control device 120 may first calculate the target command current according to the target rack stroke and, unless the second steering control device 130 fails, calculates the command current (the second command current) by multiplying the target command current by ½.

As another example, the command current calculation unit included in the first steering control device 120 calculates the target command current according to the target rack stroke and, if the second steering control device 130 fails, calculates the command current (the first command current) equal to the target command current.

Here, the first command current and the second command current may mean a current calculated by reflecting the state of the other steering control device. In particular, the range of the first command current may be relatively larger than the range of the second command current to implement a larger rack stroke than the reference rack stroke.

If the other steering control device fails, the command current application unit may apply the first command current to the steering motor 140 according to a preset application pattern and, unless the other steering control device fails, apply the second command current to the steering motor 140.

Here, the application pattern may mean a pattern in which a command current is input to the steering motor 140 to prevent burnout due to overheating. If the command current application unit continuously applies the first command current without a specific application pattern, the steering control device 200 may surge in internal temperature and burn out. Accordingly, the command current application unit may apply the first command current to the steering motor 140 in a specific application pattern to delay the surge in internal temperature as much as possible.

Meanwhile, since the second command current is calculated and applied to the steering motor 140 when the other steering control device does not fail, although the command current application unit applies the second command current to the steering motor 140 without relying on a specific application pattern, the steering control device 200 is not burned out due to overheating.

The application pattern of the command current is described below in detail.

Figure 9:
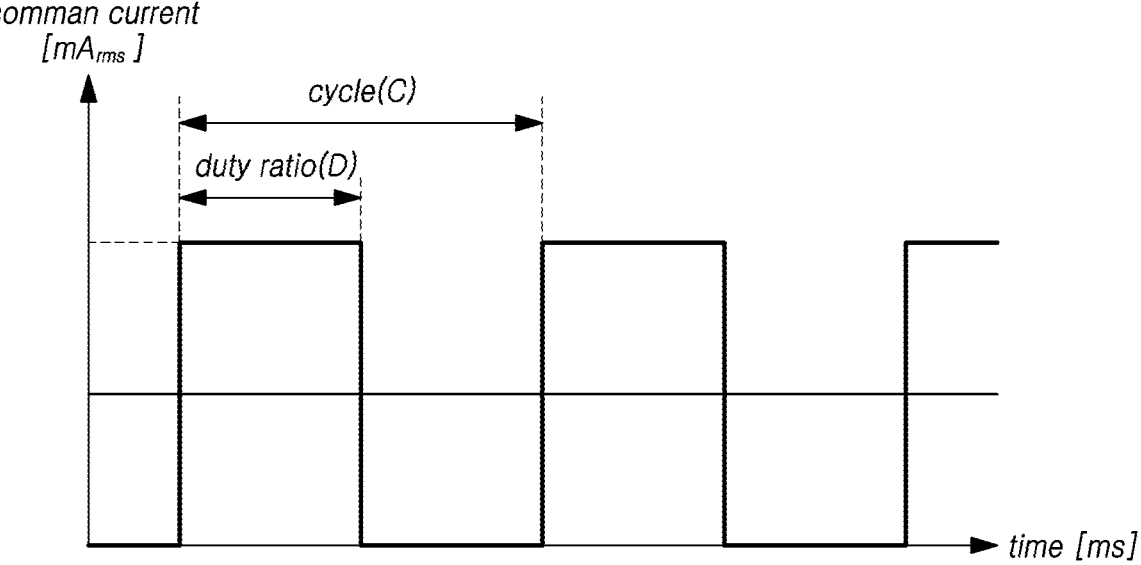
FIG. 9 is a graph illustrating an application pattern of a command current.

FIG. 9 is a graph illustrating an application pattern of a command current.

Referring to FIG. 9, various application patterns may exist. For example, a first application pattern may be a pattern formed so that a command current is continuously and uniformly applied to the steering motor 140, and a second application pattern may be a pattern formed so that a command current becomes a square wave having a constant input cycle C, duty ratio D, and amplitude. However, embodiments of the disclosure are not limited thereto.

In particular, described is an example in which a pattern identical to the second application pattern is preset is described. If the other steering control device fails, the command current application unit periodically applies the first command current to the steering motor 140 based on the preset input cycle. At this time, the first command current is a square wave having an input period C and a preset duty ratio D according to an application pattern.

Meanwhile, the command current application unit may use only any one of various application patterns, as described above, if the other steering control device fails, regardless of the target rack stroke or may use application patterns set to differ depending on target rack strokes.

Figure 10:
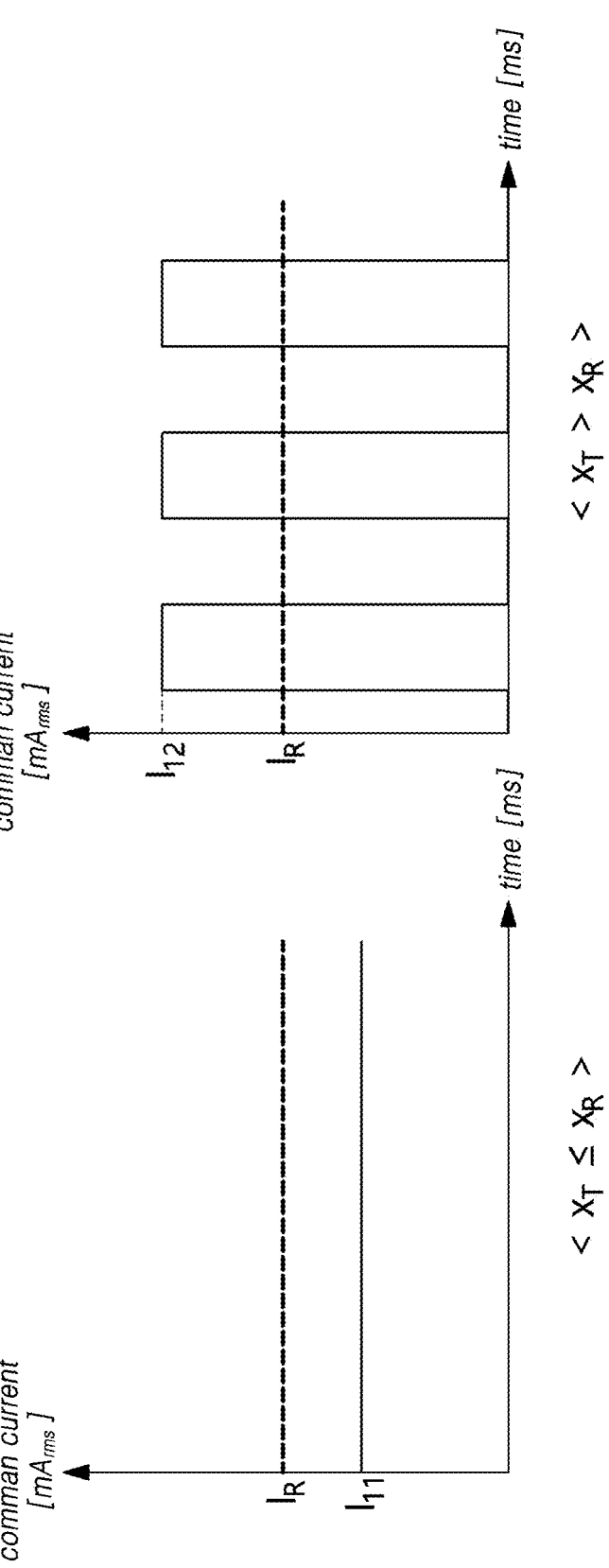
FIG. 10 is a first graph illustrating an application pattern of a command current according to a target rack stroke.

FIG. 10 is a first graph illustrating an application pattern of a command current according to a target rack stroke.

Referring to FIG. 10, as described above, if the steering control device 200 previously sets a reference rack stroke $x_R$, the first target command current $I_{11}$ is smaller than the reference command current $I_R$ corresponding to the reference rack stroke $x_R$ within a range of the target rack stroke $x_T$ not more than the reference rack stroke $x_R$. Thus, if the normal steering control device 200 calculates the target rack stroke $x_T$ smaller than the reference rack stroke $x_R$ and the first target command current $I_{11}$ according to the target rack stroke $x_T$, the normal steering control device 200 may calculate the first command current identical to the first target command current $I_{11}$ and constantly and continuously apply it to the steering motor 140.

For example, if the first steering control device 120 fails, the command current application unit included in the second steering control device 130 compares the target rack stroke $x_T$ with the preset reference rack stroke $x_R$. If the target rack stroke $x_T$ determined according to the steering information input by the driver is the reference rack stroke $x_R$ or less, the command current application unit continuously and constantly applies the first command current identical to the first target command current $I_{11}$ to the steering motor 140.

Meanwhile, within a range of the target rack stroke $x_t$ larger than the reference rack stroke $x_R$, the second target command current $I_{12}$ is equal to or larger than the reference command current $I_R$. Thus, if the normal steering control device 200 calculates the target rack stroke $x_T$ not less than the reference rack stroke $x_R$ and the second target command current $I_{12}$ according to the target rack stroke $x_T$, the steering control device 200 may calculate the first command current identical to the second target command current $I_{12}$ and apply a square wave having a preset input cycle and duty ratio, as the first command current, to the steering motor 140 until the rack stroke meets the target rack stroke $x_T$.

For example, if the first steering control device 120 fails, the command current application unit included in the second steering control device 130 compares the target rack stroke $x_T$ with the reference rack stroke $x_R$. If the target rack stroke $x_T$ determined according to the steering information input by the driver is larger than the reference rack stroke $x_R$, the command current application unit periodically applies the first command current identical to the second target command current $I_{12}$ to the steering motor 140 based on the input cycle.

As described above, the steering control device 200 according to the disclosure may efficiently prevent overheating by varying the application pattern of the first command current depending on the target rack stroke $x_T$.

Meanwhile, in the embodiment as illustrated in FIG. 10, the first command current is applied to the steering motor 140 only in an application pattern determined depending on the result of comparison between the target rack stroke $x_T$ and the reference rack stroke $x_R$.

In this case, if the target rack stroke $x_T$ is larger than the reference rack stroke $x_R$, the actual rack stroke meets the reference rack stroke $x_R$ and then meets the target rack stroke $x_T$. Thus, the application patterns as illustrated in FIG. 10 may be combined.

Figure 11:
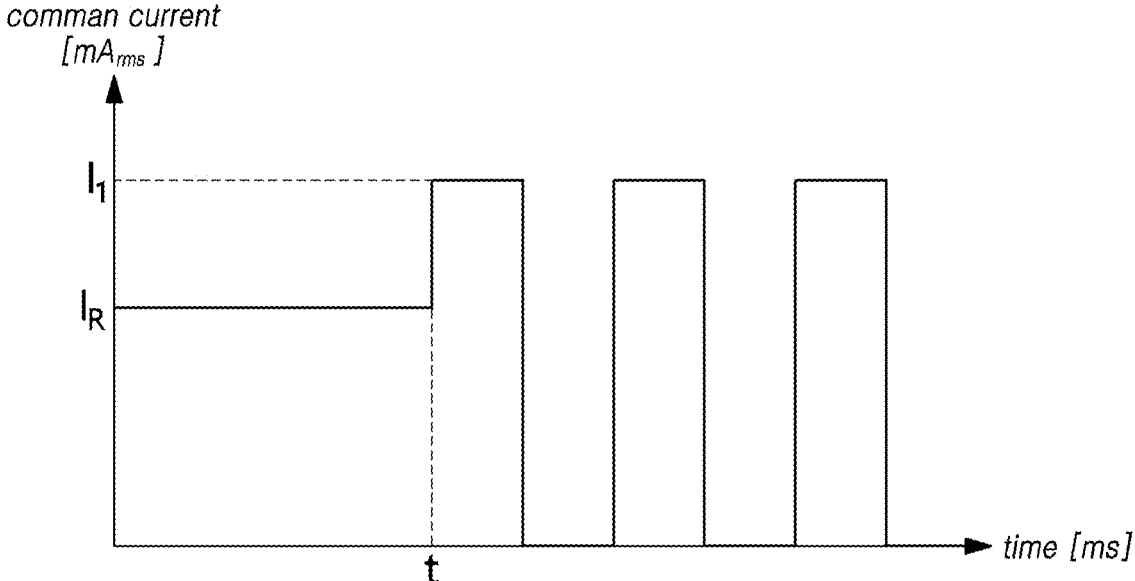
FIG. 11 is a second graph illustrating an application pattern of a command current according to a target rack stroke.

FIG. 11 is a second graph illustrating an application pattern of a command current according to a target rack stroke.

Referring to FIG. 11, if the target rack stroke $x_T$ is larger than the reference rack stroke $x_R$, the reference command current $I_R$ corresponding to the reference rack stroke $x_R$ may be used until the actual rack stroke reaches the reference rack stroke $x_R$ to shorten the steering response time. Therefore, the steering control device 200 may additionally calculate the reference command current $I_R$.

For example, the command current calculation unit included in the first steering control device 120 calculates the reference command current $I_R$ corresponding to a preset reference rack stroke $x_R$ if the second steering control device 130 corresponding to the other steering control device fails.

If the reference command current $I_R$ is calculated, the command current application unit applies the reference command current $I_R$ to the steering motor 140 until the rack stroke reaches the reference rack stroke $x_R$. In this case, since the steering control device 200 needs to identify information about the actual rack stroke, the steering control device 200 may receive rack stroke information from the rack position sensor 112.

For example, if the other steering control device (e.g., the second steering control device 130) fails, the command current application unit included in the first steering control device 120 receives rack stroke information corresponding to the position of the rack detected by the rack position sensor 112. The command current application unit applies the reference command current $I_R$ to the steering motor 140 until the rack stroke reaches the reference rack stroke $x_R$.

Meanwhile, after time t when the rack stroke reaches the reference rack stroke $x_R$, the first command current identical to the target command current is used so that the actual rack stroke reaches the target rack stroke $x_T$ and, to prevent burnout of the steering control device 200, a specific application pattern is used.

For example, after the rack stroke reaches the reference rack stroke $x_R$ (e.g., after t), the command current application unit applies the first command current $I_1$ identical to the target command current to the steering motor 140 according to the application pattern until the rack stroke reaches the target rack stroke $x_T$.

As described above, the steering control device 200 according to the disclosure may prevent a surge in internal temperature while minimizing the steering response time.

Meanwhile, in cases where an application pattern, such as a square wave, is used, it is necessary to prevent burnout by setting a different duty ratio of the application pattern depending on the initial internal temperature detected when a specific steering control device fails.

Figure 12:
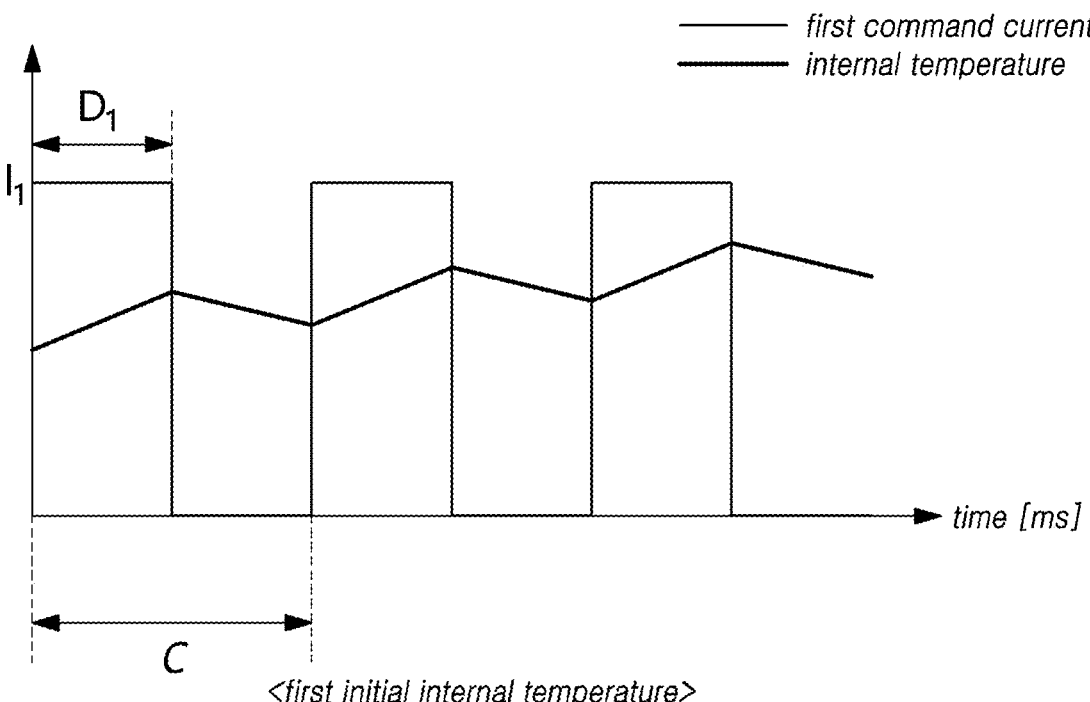
FIG. 12 is a graph illustrating an application pattern of a command current according to an internal temperature detected when a steering control device fails according to the disclosure.
Figure 12:
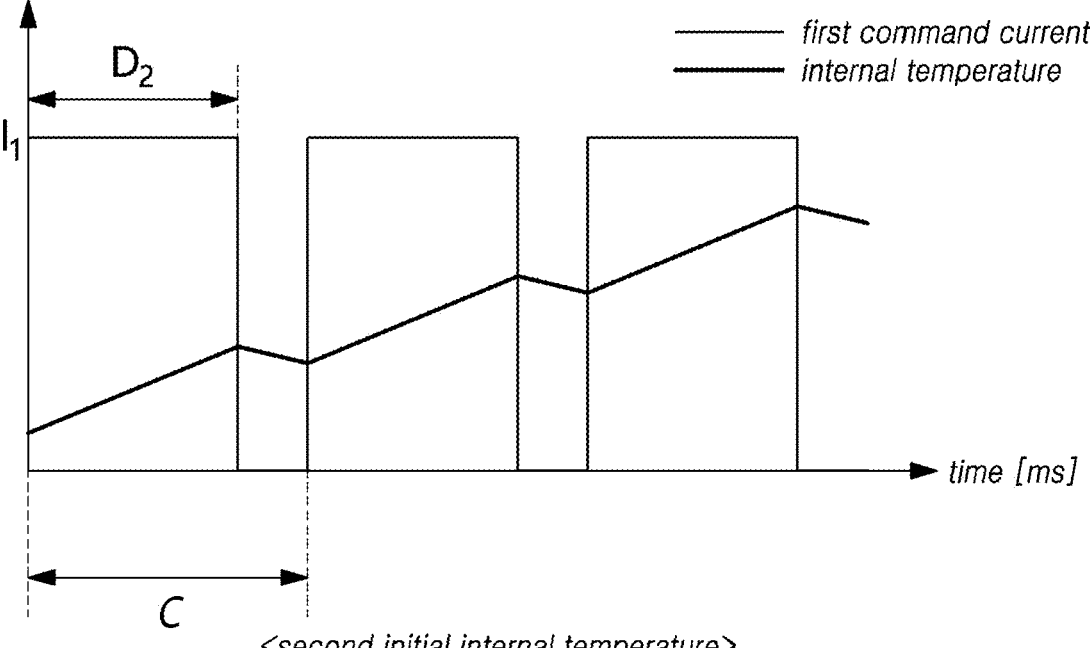

FIG. 12 is a graph illustrating an application pattern of a command current according to an internal temperature detected when a steering control device fails according to the disclosure.

Referring to FIG. 12, if the duty ratio is adjusted according to the initial internal temperature of the normal steering control device 200 detected when the other steering control device is recognized as failing, the steering response time may be minimized. Accordingly, the normal steering control device 200 may receive temperature information about its internal temperature from the temperature sensor 113.

For example, if the other steering control device (the second steering control device 130) fails, the command current application unit included in the first steering control device 120 receives temperature information about the internal temperature detected by the temperature sensor 113.

If the other steering control device fails, the normal steering control device 200 applies a square wave, as the first command current, to the steering motor 140 and adjusts the duty ratio of the square wave based on the initial temperature information of the normal steering control device 200 which is received when the other steering control device fails.

Here, the initial temperature information may mean, e.g., the internal temperature of the first steering control device 120 when the second steering control device 130 fails.

For example, when the second steering control device 130 fails, the command current application unit included in the first steering control device 120 applies a square wave having a preset input cycle and duty ratio, as the first command current, to the steering motor 140 and determines the duty ratio based on the initial temperature information of the first steering control device 120 received when the second steering control device 130 fails.

Here, the duty ratio may decrease as the initial internal temperature included in the initial temperature information increases, and the duty ratio may increase as the initial internal temperature decreases.

Referring to FIG. 12, e.g., if a square wave, as the first command current, is applied, the internal temperature of the normal steering control device 200 increases while the first command current is applied within one cycle C, and the internal temperature decreases while the first command current is not applied within one cycle C. In this case, if the first initial internal temperature is larger than the second initial internal temperature under the condition of the same cycle C and first command current $I_1$, the first duty ratio $D_1$ of the first application pattern corresponding to the first initial internal temperature is smaller than the second duty ratio $D_2$ of the second application pattern corresponding to the second initial internal temperature.

As described above, the steering control device 200 according to the disclosure may adjust the time of application of a command current considering the initial temperature, thereby preventing burnout due to overheating while minimizing the steering response time.

Figure 13:
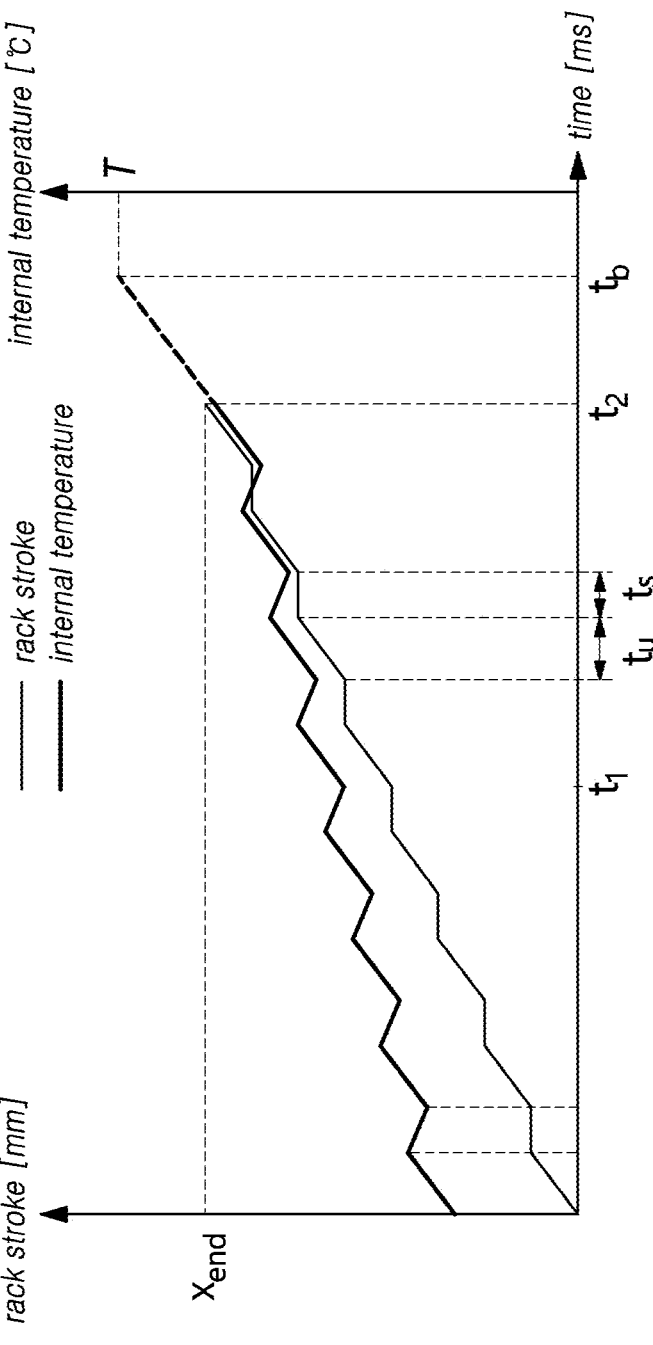
FIG. 13 is a second graph illustrating the rack stroke and internal temperature over time when a steering control device fails according to the disclosure.

FIG. 13 is a second graph illustrating the rack stroke and internal temperature over time when a steering control device fails according to the disclosure.

Referring to FIG. 13, if the normal steering control device 200 applies a command current in the form of a square wave to the steering motor 140, the internal temperature of the normal steering control device 200 is increased within the period $t_u$ during which the command current is applied to the steering motor 140 so that the rack stroke increases within one cycle. Meanwhile, in the period $t_s$ during which no rack stroke is applied within one cycle so that the rack stroke does not increase, the internal temperature of the normal steering control device 200 decreases. When the rack reaches the end (e.g., $x_{end}$), the internal temperature repetitively rises and falls.

Although the time $t_2$ when the rack reaches the end when a specific steering control device is longer than the time $t_1$ when the rack reaches the end when the plurality of steering control devices illustrated in FIG. 5 are all normal, it is possible to move the rack up to the end even without overheating damage only with the normal steering control device 200 when the specific steering control device fails.

The steering control device 200 may divide the target rack stroke into one or more sections, calculate a command current for each section, and apply the command current for each section to the steering motor 140. Specifically, the command current calculation unit 230 may calculate the target command current according to the target rack stroke, divide the section from the current position of the rack to the target rack stroke into one or more sections, and calculate the first command current as the command current for each section. The command current application unit 240 may apply the command current for each section to the steering motor 140. Referring to FIG. 2, e.g., if the current position of the rack is '0' and the target rack stroke is the end $x_{end}$ of the rack, the first steering control device 120 may divide the rack stroke section into $0$-$x_1$, $x_1$-$x_R$, $x_R$-$x_2$, and $x_2$-$x_{end}$ of FIG. 2 and set the command current values applied to the steering motor for the sections as 40%, 50%, 75%, and 100%, respectively, of the target command current value. The command current application unit 240 may apply, to the steering motor 140, 40% of the target command current value in the $0$-$x_1$ section, 50% of the target command current value in the $x_1$-$x_R$ section, 75% of the target command current value in the $x_R$-$x_2$ section, and 100% of the target command current value in the $x_2$-$x_{end}$ section.

The steering control device 200 may receive the rack stroke information corresponding to the position of the rack detected by the rack position sensor and, if the rack stroke reaches the starting point of each section of the target rack stroke, apply the command current for each section, in the form of a square wave having a preset input cycle and duty ration, to the steering motor 140. Specifically, the command current application unit 240 may receive the rack stroke information corresponding to the position of the rack detected by the rack position sensor and determine which point in which section the current position of the rack has reached. If the position of the rack reaches the starting point of each section, the command current application unit 240 may apply a square wave having a preset input cycle and duty ratio, as the command current for each section, to steering motor 140.

The steering control device 200 may apply, to the steering motor 140, a square wave having a preset input cycle and duty ratio, as the command current applied in the section including a preset reference rack stroke or a rack stroke larger than the reference rack stroke among the per-section command currents. Specifically, the command current application unit 240 may apply a square wave having a preset input cycle and duty ratio, as the command current applied in the section including the reference rack stroke or including a rack stroke larger than the reference rack stroke among the per-section command currents generated as the target rack stroke is larger than the reference rack stroke. If the position of the rack reaches the starting point of the above-described section, the command current application unit 240 may receive the internal temperature of the steering control device 200 from the temperature sensor 113 and utilize it as initial temperature information. In other words, the command current application unit 240 may determine the duty ratio of the command current applied to the steering motor 140 based on the initial temperature information if the position of the rack reaches the starting point of the above-described section. For example, if the second steering device 130 fails, the target rack stroke is $x_2$ of FIG. 2, the current position of the rack is '0,' and the rack stroke is $x_R$, the first steering device 120 may divide the rack stroke section into $0$-$x_1$, $x_1$-$x_R$, and $x_R$-$x_2$ and may apply a square-wave command current which is 40% of the command current corresponding to the end $x_{end}$ of the rack in the $0$-$x_1$ section and a square-wave command current which is 50% in the $x_1$-$x_R$ section and, in the $x_R$-$x_2$ section, the first steering device 120 may determine a duty ratio based on the temperature information when the rack is positioned at $x_R$ and apply a square-wave command current which is 75% of the command current corresponding to the end $x_{end}$ of the rack.

As described above, the steering control device 200 may divide the target rack stroke into one or more sections and apply appropriate command currents and, by applying the command currents in a predetermined duty ratio and application pattern, prevent burnout of the steering control device 200 due to a surge in internal temperature.

A steering control method for performing all the embodiments of the disclosure is described below in detail.

Figure 14:
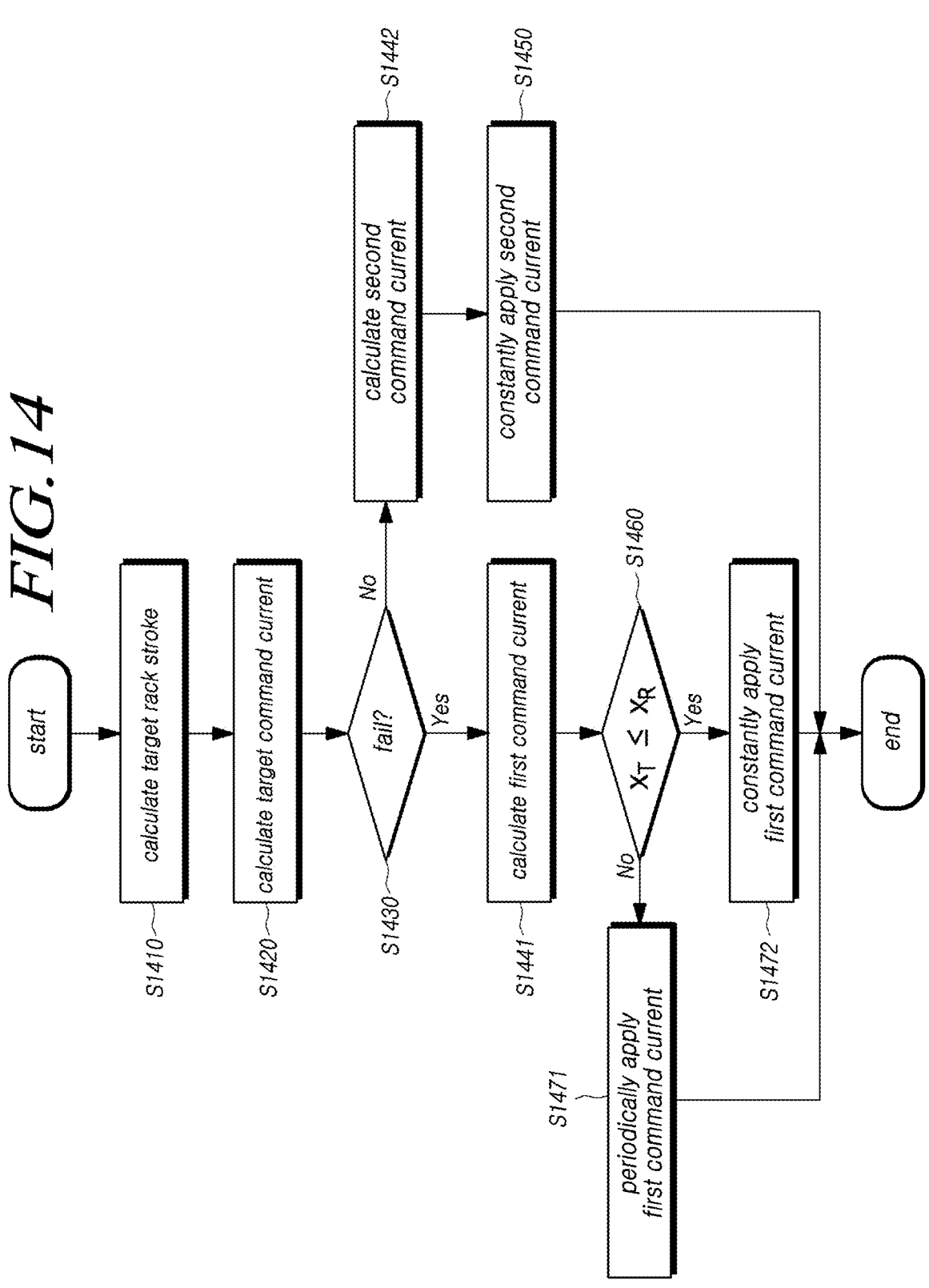
FIG. 14 is a flowchart illustrating an embodiment of a steering control method according to the disclosure.

FIG. 14 is a flowchart illustrating an embodiment of a steering control method according to the disclosure.

Referring to FIG. 14, in step S1410, a target rack stroke $x_T$ is calculated based on the steering information input by the driver. Ink step S1420, a target command current according to the target rack stroke $x_T$ is calculated. In step S1430, it is recognized whether the other steering control device fails.

In the command current calculation step S1441 and S1442, a different command current is calculated depending on whether the other steering control device fails. In other words, if the other steering control device fails, a first command current is calculated in step S1441 and, unless the other steering control device fails, a second command current smaller than the first command current is calculated in step S1442.

Specifically, if the other steering control device (the first steering control device 120 or the second steering control device 130) fails, the first command current identical to the target command current is calculated in step S1441 and, unless the other steering control device (the first steering control device 120 or the second steering control device 130) fails, the second command current is calculated by dividing the target command current by the number of steering control devices (e.g., ½) in step S1442.

If the second command current is calculated, the second command current is continuously and constantly applied to the steering motor 140 in step S1450.

Meanwhile, if the other steering control device fails, the target rack stroke $x_T$ and a preset reference rack stroke $x_R$ are compared in step S1460.

If the target rack stroke $x_T$ is larger than the reference rack stroke $x_R$, the first command current is periodically applied to the steering motor 140 based on a preset input cycle in step S1471.

If the target rack stroke $x_T$ is the reference rack stroke $x_R$ or less, the first command current is continuously and constantly applied to the steering motor 140 in step S1472.

Although not shown, if the other steering control device fails, the steering control method according to the disclosure skips step S1460 and may perform the step of periodically applying the first command current to the steering motor 140 based on a preset input cycle.

Meanwhile, the first command current may be calculated as a command current for each section into which the target rack stroke $x_T$ is divided. Accordingly, in steps S1471 and S1472, the command current for each section may be periodically or constantly applied.

Figure 15:
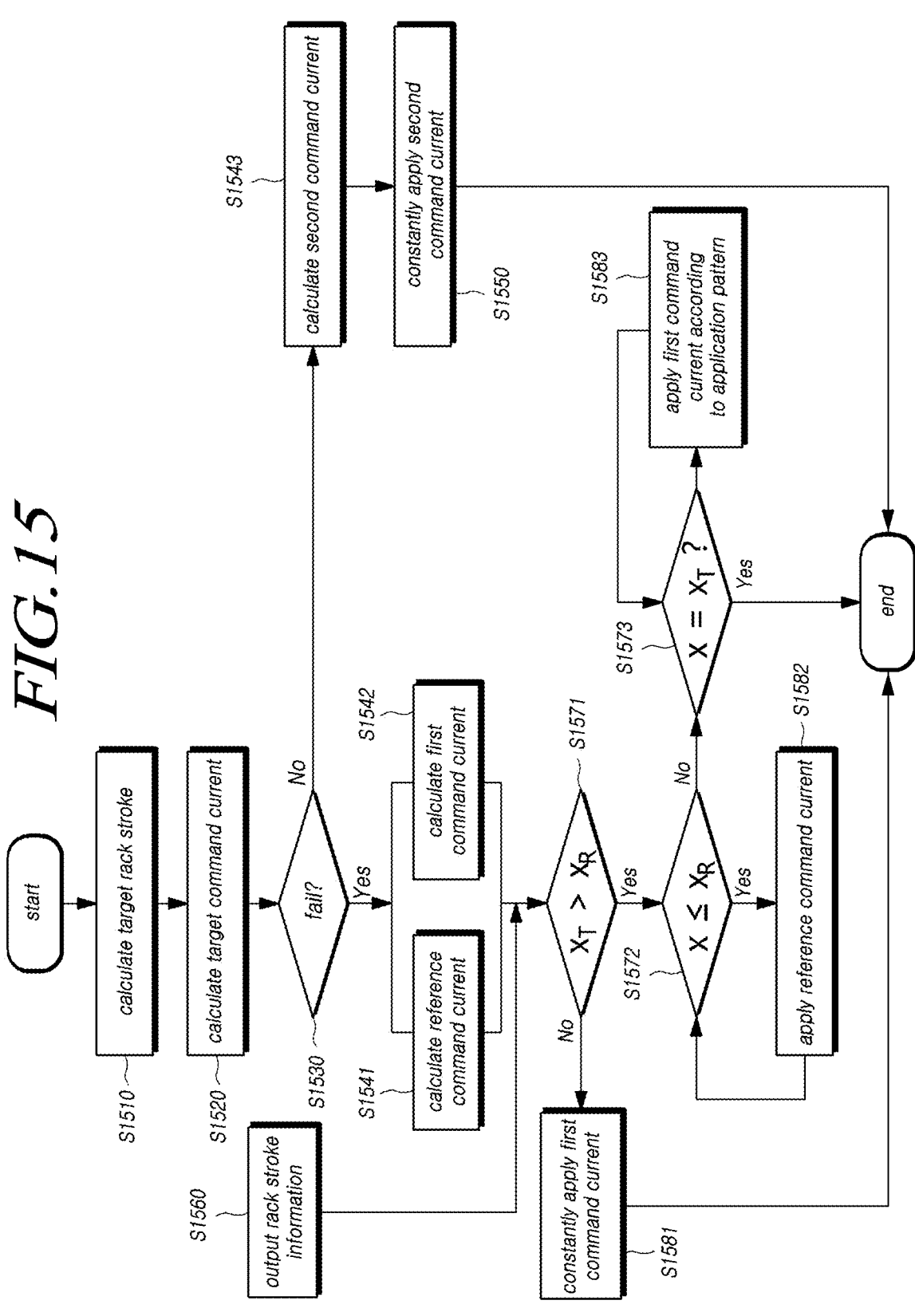
FIG. 15 is a flowchart illustrating another embodiment of a steering control method according to the disclosure.

FIG. 15 is a flowchart illustrating another embodiment of a steering control method according to the disclosure.

Referring to FIG. 15, steps S1510 to S1530 are the same as steps S1410 to S1430 illustrated in FIG. 14, and no description thereof is thus given.

If the other steering control device fails, a reference command current corresponding to the preset reference rack stroke $x_R$ is calculated in step S1541 and, in step S1542, the first command current is calculated.

Unless the other steering control device fails, a second command current smaller than the first command current is calculated in step S1543.

If the second command current is calculated, the second command current is continuously and constantly applied to the steering motor 140 in step S1550.

Meanwhile, in step S1560, the rack position sensor 112 detects the position of the rack and outputs rack stroke information.

Next, in step S1571, the target rack stroke $x_T$ and the reference rack stroke $x_R$ are compared.

If the target rack stroke $x_T$ is the reference rack stroke $x_R$ or less, the first command current is continuously and constantly applied to the steering motor 140 in step S1581.

If the target rack stroke is greater than the reference rack stroke, the reference command current is applied to the steering motor 140 (S1582) until the rack stroke reaches the reference rack stroke (S1572).

The first command current is applied to the steering motor 140 according to the application pattern (S1583) until the rack stroke reaches the target rack stroke (S1573) after the rack stroke reaches the reference rack stroke.

As described above, according to the disclosure, the disclosure may provide a steering assist system, a steering control device, and a steering control method capable of performing steering of a vehicle even when a specific steering control device among a plurality of steering control devices fails.

The disclosure may also provide a steering assist system, a steering control device, and a steering control method capable of preventing a normal steering control device from being damaged due to overheating when a specific steering control device fails.

The disclosure may also provide a steering assist system, a steering control device, and a steering control method capable of preventing a delay in steering response time by applying a command current to a steering motor according to various application patterns.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering control device comprising a controller configured to:

calculate a target rack stroke, which is a rack stroke of a rack bar required for generating a steering assistance force, based on steering information input by a driver;

recognize whether an other steering control device fails;

calculate a target command current according to the target rack stroke by calculating a first command current if the other steering control device fails and calculating a second command current smaller than the first command current if the other steering control device does not fail; and if the other steering control device does not fail, apply the second command current smaller than the first command current to the steering motor;

if the other steering control device fails and the target rack stroke is less than or identical to a reference rack stroke, continuously and constantly apply the first command current, larger than the second command current, to the steering motor; and

if the other steering control device fails and the target rack stroke is larger than the reference rack stroke, periodically apply the first command current, larger than the second command current, to the steering motor based on a preset input cycle.

2. The steering control device of claim 1, wherein the controller is configured to calculate the first command current identical to the target command current if the other steering control device fails, and calculate the second command current by dividing the target command current by a number of steering control devices connected to the steering motor if the other steering control device does not fail.

3. The steering control device of claim 1, wherein the controller is configured to periodically apply the first command current to the steering motor based on a preset input cycle if the other steering control device fails.

4. The steering control device of claim 3, wherein the first command current is a square wave having the input cycle and a preset duty ratio.

5. The steering control device of claim 1, wherein the controller is configured to calculate a reference command current corresponding to a preset reference rack stroke if the other steering control device fails, and wherein the controller is configured to receive rack stroke information corresponding to a position of a rack detected by a rack position sensor if the other steering control device fails, apply the reference command current to the steering motor until a rack stroke reaches the reference rack stroke if the target rack stroke is larger than the reference rack stroke, and apply the first command current to the steering motor until the rack stroke reaches the target rack stroke after the rack stroke reaches the reference rack stroke.

6. The steering control device of claim 1, wherein the controller is configured to receive temperature information about an internal temperature detected by a temperature sensor if the other steering control device fails, and apply a square wave having a preset input cycle and duty ratio, as the first command current, to the steering motor, and wherein the duty ratio is determined based on initial temperature information received when the other steering control device fails.

7. The steering control device of claim 6, wherein the duty ratio decreases as an initial internal temperature included in the initial temperature information increases, and increases as the initial internal temperature decreases.

8. The steering control device of claim 1, wherein the first command current is calculated as a command current for each of one or more sections into which the target rack stroke is divided, and wherein the controller is configured to apply the command current for each section to the steering motor.

9. The steering control device of claim 8, wherein the controller is configured to receive rack stroke information corresponding to a position of a rack detected by a rack position sensor, and apply a square wave having a preset input cycle and duty ratio, as the command current for each section, to the steering motor if the other steering control device fails and the rack stroke reaches a starting point of each section of the target rack stroke.

10. The steering control device of claim 9, wherein the controller is configured to apply, to the steering motor, the square wave having the preset input cycle and duty ratio, as a command current applied in a section including a preset reference rack stroke or a rack stroke larger than the reference rack stroke among the per-section command currents.

11. One or more non-transitory computer-readable media storing computer-readable instructions that when executed by one or more processors cause the one or more processors to perform operations, the operations comprising:

calculating a target rack stroke, which is a rack stroke of a rack bar required for generating a steering assistance force, based on steering information input by a driver;

calculating a target command current according to the target rack stroke;

recognizing whether an other steering control device fails;

calculating a first command current if the other steering control device fails and calculating a second command current smaller than the first command current if the other steering control device does not fail;

if the other steering control device does not fail, applying the second command current smaller than the first command current to the steering motor;

if the other steering control device fails and the target rack stroke is less than or identical to a reference rack stroke, continuously and constantly applying the first command current to the steering motor; and if the other steering control device fails and the target rack stroke is larger than the reference rack stroke, periodically applying the first command current to the steering motor based on a preset input cycle.

12. The one or more non-transitory computer-readable media of claim 11, wherein the calculating of the first command current or the second command current comprises calculating the first command current identical to the target command current if the other steering control device fails, and calculating the second command current by dividing the target command current by a number of steering control devices if the other steering control device does not fail.

13. The one or more non-transitory computer-readable media of claim 11, wherein the applying of the first command current comprises periodically applying the first command current to the steering motor based on a preset input cycle if the other steering control device fails.

14. The one or more non-transitory computer-readable media of claim 11, wherein the operations further comprise:

by a rack position sensor, detecting a position of a rack and outputting rack stroke information, and calculating a reference command current corresponding to a preset reference rack stroke if the other steering control device fails, wherein the applying of the first command current comprises applying the reference command current to the steering motor until a rack stroke reaches the reference rack stroke if the target rack stroke is larger than the reference rack stroke, and applying the first command current to the steering motor according to the application pattern until the rack stroke reaches the target rack stroke after the rack stroke reaches the reference rack stroke.

15. The one or more non-transitory computer-readable media of claim 11, wherein the operations further comprise:

by a temperature sensor, detecting an internal temperature of the steering control device and outputs temperature information, wherein the applying of the first command current comprises applying a square wave having a preset input cycle and duty ratio, as the first command current, to the steering motor, and wherein the duty ratio is determined based on the temperature information in a state where the other steering control device fails.

16. The one or more non-transitory computer-readable media of claim 11, wherein the first command current is calculated as a command current for each of one or more sections into which the target rack stroke is divided, and wherein the applying of the first command current comprises applying the command current for each section to the steering motor.

17. A steering assist system, comprising:

a steering angle sensor detecting a steering angle by rotation of a steering wheel, and generating and outputting steering information about the steering angle;

a steering motor including a first winding motor and a second winding motor;

a first steering control device electrically connected with the first winding motor; and a second steering control device electrically connected with the second winding motor and electrically connected with the first steering control device configured to communicate with the first steering control device, wherein the first steering control device is configured to:

calculate a target rack stroke, which is a rack stroke of a rack bar required for generating a steering assistance force, and a target command current corresponding to the target rack stroke based on the steering information, recognize whether the second steering control device fails, if the second steering control device does not fail, calculate a second command current corresponding to half of the target command current and apply the second command current to the steering motor, and if the second steering control device fails and the target rack stroke is less than or identical to a reference rack stroke, continuously and constantly apply the first command current, identical to the target command current, to the steering motor; and if the second steering control device fails and the target rack stroke is larger than the reference rack stroke, periodically apply the first command current, identical to the target command current, to the steering motor based on a preset input cycle.

* * * * *